July 5, 1955  C. T. PIERMATTEO  2,712,589
WATER HEATER
Filed June 14, 1954  2 Sheets-Sheet 1
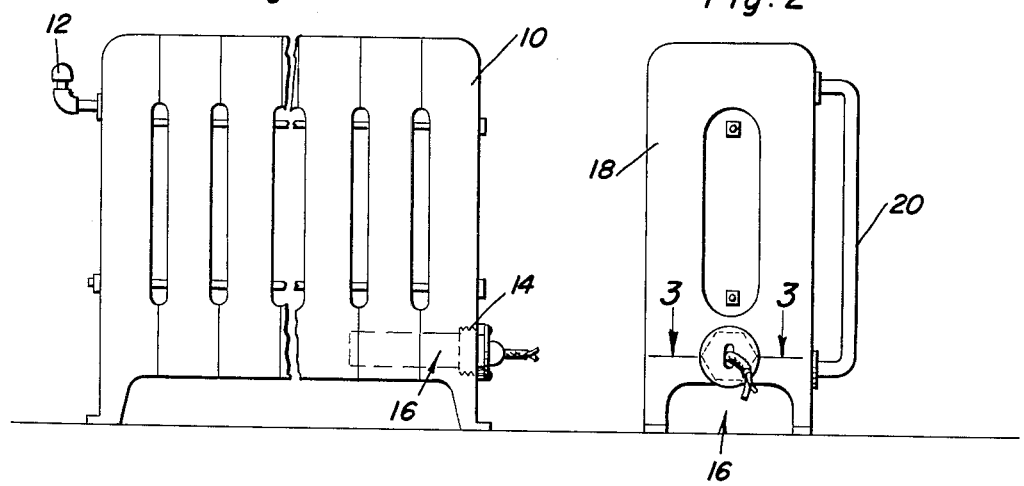
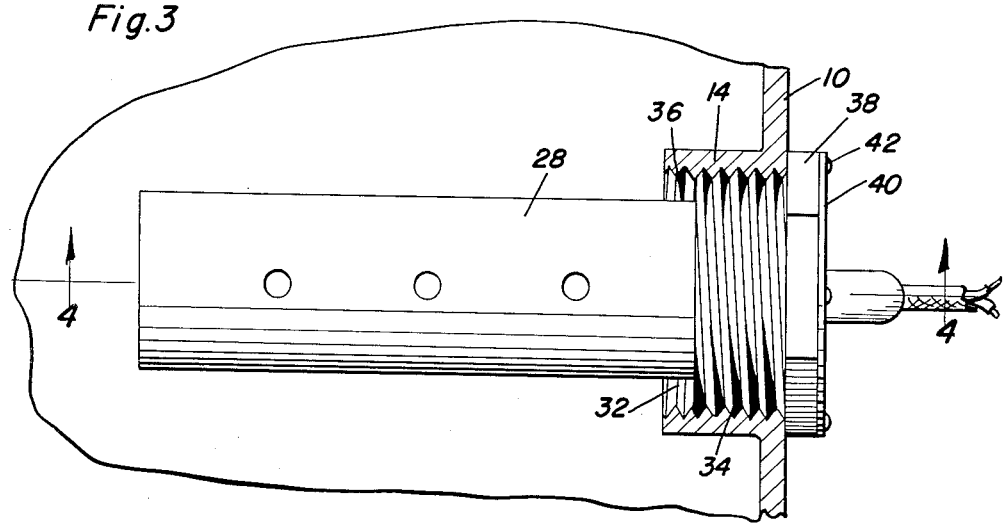
Charles T. Piermatteo
INVENTOR.

July 5, 1955 C. T. PIERMATTEO 2,712,589
WATER HEATER
Filed June 14, 1954 2 Sheets-Sheet 2
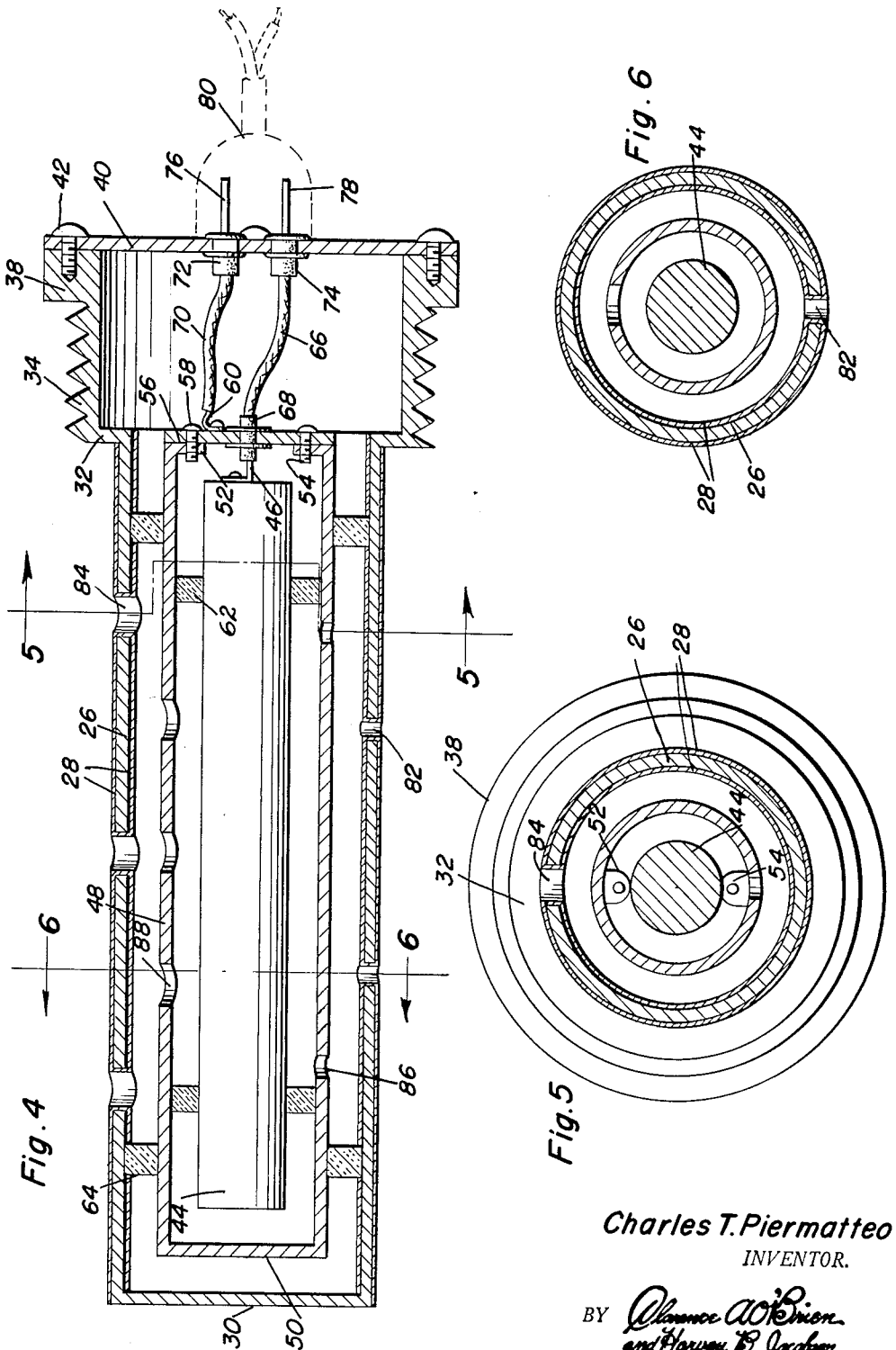
Charles T. Piermatteo
INVENTOR.
BY Clarence A. O'Brien
and Harvey B. Jacobson
Attorneys United States Patent Office 2,712,589
Patented July 5, 1955

2,712,589

WATER HEATER

Charles T. Piermatteo, Philadelphia, Pa.

Application June 14, 1954, Serial No. 436,544

8 Claims. (Cl. 219—40)

This invention relates to a water heater and particularly to an electric heating device for heating the water in a boiler, radiator or other device.

In the construction and utilization of water heaters of the type using the direct conduction of electricity through the water as the heating medium, considerable loss has been incurred because of the leakage of electricity to the parts of the heating construction and also because of the high current conductivity of cold water as compared with hot water.

In the present construction a heater has been provided in which the parts are insulated against the loss of electric current to portions of the heater and in which the water is maintained at a substantially high temperature adjacent to the electrodes so that a reduced current flow for maximum heating is obtained.

In the construction according to the invention, an inner electrode of carbon or other suitable conducting material is placed within a cylindrical electrode of carbon, or the like, and the pair of electrodes are maintained in spaced relation by means of suitable insulating spacers and the entire electrode system is enclosed in a housing of suitable metallic material which is coated with an insulating material so that no electric current can flow from the electrodes to the enclosing housing. The housing again being spaced from the outer electrode by any suitable insulating spacer. The housings and the outer electrode are provided with apertures so that water may enter at the lower side of the device and flow upwardly and over the electrodes and the hot water or steam may escape from the top of the apertures in the means of jets. The aperture construction being such that the water will flow into and remain in the heaters until thoroughly heated at which time the steam will cause the ejection of the hot water so that the heating is conducted at relatively high temperature so that the conduction of the water will be materially decreased for the amount of heat produced.

It is accordingly an object of the invention to provide an improved water heater.

It is a further object of the invention to provide a water heater having a low electric consumption.

It is a further object of the invention to provide a heater controlling the flow of water therethrough.

Other objects and many of the attendant advantages of the present invention will be apparent from the following detailed description taken in conjunction with the accompanying drawings, in which:

Figure 1 is a front elevational view of a space heater utilizing a water heater according to the invention;

Figure 2 is an end elevation of a space heater showing the installation of the water heater therein;

Figure 3 is a sectional view taken substantially on a plane indicated by the section line 3—3 of Figure 2 and showing the manner of installing the water heater in a space heating device;

Figure 4 is a longitudinal sectional elevation through the water heater showing the construction and arrangements of the parts thereof;

Figure 5 is a cross sectional view through the water heater taken substantially on the plane indicated by the section line 5—5 of Figure 4; and Figure 6 is a cross section through the water heater taken substantially on the plane indicated by the section line 6—6 of Figure 4.

In the exemplary embodiment according to the invention, the space heater herein indicated as a water jacket 10 having a filling aperture 12 so that a quantity of water (not shown) may be introduced into the casing 10 and having an aperture 14 for the reception of the water heater indicated generally at 16. Preferably the space heater 10 is provided with a radiator section 18 and a return section 20 so that the heated water rising upwardly from the heater 16 will radiate heat to the space about the radiators and the cold water will return through the return connection 20 into the vicinity of the heater 16.

Obviously, the heater 16 may be utilized for any purpose where hot water or steam is to be provided and may be utilized for a central boiler instead of an isolated radiator or may be used in a domestic hot water heater or other water storage tank.

In the construction of the heater proper an outer casing 26 of suitable metal construction such as cast iron is provided with an insulating coating 28 preferably of porcelain which covers both the inner and outer surfaces thereof and the edges of apertures described hereinafter and completely insulates the metal housing 26 from any current in the water to be contained therein.

The housing 26 is substantially cylindrical in construction and is provided with a closed end 30. The end opposite the closed end 30 is provided with a mounting head 32 having screw threaded portion 34 for engagement with the threads 36 of the mounting portion 14 of the hot water container. Preferably a collar 38 is provided at the outer end of the head 32 for reception of a closure disc 40. The disc 40 being connected in water-tight relation to the housing 26 by any suitable means such as the fastening screws 42.

The electrode construction proper comprises an inner electrode 44 herein shown as an elongated cylinder constructed of carbon or other similar conducting material which is substantially not subject to oxidation or corrosion when subjected to return flow of water. A conductor 46 is connected to one end of the electrode 44 and extends outwardly from the casing as will presently be described.

A second electrode 48 is provided as a hollow cylinder constructed of carbon or similar material and is provided with a bottom member 50 which completely closes one end thereof. Inturned ears 52 and 54 are provided adjacent the opposite end of the electrode 48 and a closure plate 56 of carbon, graphite, or the like, is applied to the ears 52 by any suitable means such as the fastening screws 58. A conductor 60 is connected to the electrode 48 preferably by connection to the cap 56 and extends outwardly from the housing as will presently be described.

Inner electrode cylinder 44 is spaced from and insulated from the outer electrode cylinder 48 by means of a plurality of ring-like collars 62 constructed of porcelain or similar electrical insulating material. Preferably the collars 62 are of relatively tight fit on the carbon electrode 44 and the interior of the carbon electrode 48.

The electrode construction is separated from the housing 26 by means of ring-like collars 64 which are preferably constructed of porcelain or similar material and form a snug fit in the interior of the housing 26 and also a snug fit on the exterior of the electrode 48.

The electrode conductor 46 is provided with an insulating coating 66 and the entire construction is passed through the closure plate 56 of the electrode 48 by means of a suitable grommet 68 preferably of insulating material. The conductor 60 is likewise provided with insulating coating 70 which may be of rubber or other similar material and the conductors 46 and 60 each extend through the closure plate 40 by means of water tight grommets 72 and 74. The grommets 72 and 74 must be sufficiently compacted that they will be water tight against any pressure maintained in the housing 26.

Preferably the conductors 46 and 60 terminate in prongs 76 and 78 for connection to a suitable electrical connection 80.

The housing 26 is provided with bottom apertures 82 and with top apertures 84. The top apertures 84 being of relatively larger cross sectional area than the bottom apertures 82 so that there is restriction of flow of cold water into the housing 28 while the hot water and steam may readily escape from the top apertures 84.

The electrode 48 is likewise provided with bottom apertures 86 and top apertures 88 and like the apertures 82 and 84, the bottom aperture 86 is of relatively small size in respect to the top apertures 88.

In the utilization of the water heater according to the invention, the heating element will be connected in any suitable boiler or other water utilizing device and preferably will be provided with a gasket between the collar 38 and the heating element so that a firm water tight connection may be made without cracking the porcelain insulation on the housing 26. The device will then be filled with water to any suitable extent and electric current will be supplied from the connection 80 through the conductors 46 and 60 so that current flow will occur through the water within the space between the electrodes 44 and 48. Because of the relatively restricted area of the water inlet, the water will tend to flow slowly out of the device until it is substantially thoroughly heated at which time the steam will produce a jet action to forcibly eject the hot water through the top apertures 88 and 84 while fresh water will flow through the bottom apertures 82 and 86 at a relatively low speed to maintain the constant flowing of water within the heater until such time as it is heated to steam to be rapidly ejected therefrom.

Because of the insulated construction of the outer housing 26 there is little tendency of the electric current to escape into the housing 26 or into the other portions of the water container so that substantially all of the current is utilized to heat the water and since the water will be heated while at high resistance because of the high temperature thereof, the loss of current in low conducting water will be substantially eliminated.

For a purpose of exemplification a particular embodiment of the invention has been shown and described according to the best present understanding thereof. However, it will be apparent to those skilled in the art that various changes and modifications in the construction and arrangements of the parts thereof may be readily resorted to without departing from the true spirit and scope of the invention.

What is claimed as new is as follows:

1. An electric water heater comprising a first elongated carbon electrode, a second tubular electrode, said second electrode enclosing said first elongated electrode, insulating spacers maintaining said electrodes in spaced relation, a plurality of apertures in said second electrode, an electrical conductor secured to each of said electrodes, the conductor attached to said first electrode extending in insulated relation through said second electrode.

2. An electric water heater comprising a first elongated carbon electrode, a second cylindrical electrode, said second electrode enclosing said first elongated electrode, insulating spacers maintaining said electrodes in spaced relation, a plurality of apertures in said second electrode, an electrical conductor secured to each of said electrodes, the conductor attached to said first electrode extending in insulated relation through said second electrode, an insulated housing enclosing said electrodes, said housing having a plurality of apertures therein.

3. An electric water heater comprising a first elongated carbon electrode, a second cylindrical electrode, said second electrode enclosing said first elongated electrode, insulating spacers maintaining said electrodes in spaced relation, a plurality of apertures in said second electrode, an electrical conductor secured to each of said electrodes, the conductor attached to said first electrode extending in insulated relation through said second electrode, an insulated housing enclosing said electrodes, said housing having a plurality of apertures therein, insulating mounting blocks interposed between said housing and said second electrode.

4. An electric water heater comprising a first cylinder constructed of carbon, a second carbon cylinder enclosing said first cylinder, insulating spacing rings spacing said cylinders, electrical conductors connected to said cylinders, said second cylinder having a plurality of apertures in the top and bottom thereof, the apertures in the top being of larger capacity than the apertures in the bottom, a metallic housing enclosing said cylinders, an insulating coating on said housing.

5. An electric water heater comprising a first cylinder constructed of carbon, a second carbon cylinder enclosing said first cylinder, insulating spacing rings spacing said cylinders, electrical conductors connected to said cylinders, said second cylinder having a plurality of apertures in the top and bottom thereof, the apertures in the top being of larger capacity than the apertures in the bottom, a metallic housing enclosing said cylinders, an insulating coating on said housing, said metallic housing having top and bottom apertures, said top apertures having greater capacity than the bottom apertures.

6. An electric water heater comprising a first cylinder constructed of carbon, a second carbon cylinder enclosing said first cylinder, insulating spacing rings spacing said cylinders, electrical conductors connected to said cylinders, said second cylinder having a plurality of apertures in the top and bottom thereof, the apertures in the top being of larger capacity than the apertures in the bottom, a metallic housing enclosing said cylinders, an insulating coating on said housing, said metallic housing having top and bottom apertures, said top apertures having greater capacity than the bottom apertures, an enlarged mounting head on said housing, means for securing said head to a water container.

7. An electric water heater comprising a first cylindrical electrode, said electrode being constructed of carbon, a second cylindrical electrode including said first electrode, a plurality of ring insulators spacing said electrodes, a substantially cylindrical housing including said electrodes, a plurality of ring insulators spacing said housing from said electrodes, electrical conductors connected to said electrodes, said conductors extending in insulated relation through said housing.

8. An electric water heater comprising a first cylindrical electrode, said electrode being constructed of carbon, a second cylindrical electrode including said first electrode, a plurality of ring insulators spacing said electrodes, a substantially cylindrical housing including said electrodes, a plurality of ring insulators spacing said housing from said electrodes, electrical conductors connected to said electrodes, said conductors extending in insulated relation through said housing, said second electrode having upper and lower perforations therein, said housing having upper and lower apertures therein, the upper apertures having greater capacity than the lower apertures.

References Cited in the file of this patent

UNITED STATES PATENTS

| | | |
|---|---|---|
| 1,384,719 | Herbert | July 12, 1921 |
| 1,437,119 | Speck | Nov. 28, 1922 |
| 2,266,016 | Fisher | Dec. 16, 1941 |
| 2,319,266 | Rush | May 18, 1943 |
| 2,429,112 | Warren | Oct. 14, 1947 |